(12) United States Patent
Vanwiggeren

(10) Patent No.: US 6,813,028 B2
(45) Date of Patent: Nov. 2, 2004

(54) CALIBRATION METHODOLOGY AND SYSTEM FOR OPTICAL NETWORK ANALYZER

(75) Inventor: Gregory D. Vanwiggeren, Los Gatos, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 272 days.

(21) Appl. No.: 10/205,720

(22) Filed: Jul. 25, 2002

(65) Prior Publication Data

US 2004/0019445 A1 Jan. 29, 2004

(51) Int. Cl.[7] .............................................. G01B 9/02
(52) U.S. Cl. ...................................................... 356/477
(58) Field of Search ................................. 356/73.1, 277, 356/484, 491; 250/227.19, 227.27

(56) References Cited

U.S. PATENT DOCUMENTS 5,619,325 A * 4/1997 Yoshida ....................... 356/491
6,259,529 B1 * 7/2001 Sorin et al. .................. 356/484
6,606,158 B2 * 8/2003 Rosenfeldt et al. .......... 356/477

* cited by examiner

Primary Examiner—Samuel A. Turner
Assistant Examiner—Michael A. Lyons

(57) ABSTRACT

A method and system for calibrating an interferometric optical network analyzer is disclosed. Specifically, a plurality of interferometric measurements for a control optical element using first polarized lightwaves of a first amplitude and second polarized lightwaves of a second amplitude are received in accordance with the invention. Next, a calibration result is derived using the plurality of interferometric measurements in accordance with the present invention. With this calibration result, the optical properties of a device under test (DUT) measured using the first polarized lightwaves of the first amplitude and the second polarized lightwaves of the second amplitude can be determined with reduced uncertainty due to intrinsic optical characteristics of the interferometric optical network analyzer.

28 Claims, 8 Drawing Sheets

CALIBRATION METHODOLOGY AND SYSTEM FOR OPTICAL NETWORK ANALYZER

TECHNICAL FIELD

The present claimed invention relates to the field of optical network analysis. More specifically, the present claimed invention relates to calibration of an optical network analyzer.

BACKGROUND ART

Optical network analysis has been used to determine the optical characteristics of optical network components. For example, the optical characteristics of a fiber Bragg grating or series of fiber Bragg gratings can be determined using an optical network analyzer. More generally, optical network analyzers are used to determine the optical characteristics of various optical components, composite optical systems, and various other types of devices under test (DUTs).

Recently, advancements have been made in optical network analysis which enable extremely precise determination of the optical characteristics of an optical component. Specifically, interferometric optical analysis methods can now be used to precisely examine and measure the optical characteristics of an optical component. However, as the precision of such measurements improve, uncertainties or errors associated with the optical network analyzer itself become of greater concern. For example, an interferometric optical network analyzer may have an internal polarization dependent loss (PDL) of plus or minus several tenths of a dB. As a result, when attempting to determine the optical characteristic of an optical component (e.g. to plus or minus 50 milli-dB), the quantity of the PDL uncertainty associated with the optical network analyzer makes is difficult or impossible to measure the PDL of the optical component with the precision desired. Although the above discussion specifically refers to measurement of PDL, such an example is intended to be exemplary. That is, the uncertain intrinsic optical properties of conventional interferometric optical network analyzers also reduce the precision with which the measurement of various other optical characteristics can ultimately be made.

One approach to overcome the above-listed disadvantage is to attempt to reduce the uncertainties or errors associated with the intrinsic optical properties of the optical network analyzer itself. For example, an interferometric optical network analyzer may be constructed using optically inert components. For purposes of the present application, a component which is referred to as "optically inert" is an optical component which introduces no or very small degradation of measured optical characteristics. Typically, this means that such optically inert components possess low PDL and polarization mode dispersion (PMD). Such optically inert components, however, are typically quite expensive. As a result, the cost increase incurred by using such optically inert components can render a conventional interferometric optical network analyzer prohibitively expensive. Furthermore, even when optically inert components are used, the magnitude of the cumulative uncertainties may still be too great to enable measurement of the optical characteristic of the optical component with the precision desired.

Thus, a need exists for a method and system to readily determine the optical characteristics of an optical component. A further need exists for a method and system which meets the above need and can precisely determine the optical characteristics of an optical component. Another need exists for a method and system which meets the above needs and which does not require the use of an optical network analyzer comprised of optically inert components.

DISCLOSURE OF THE INVENTION

In accordance with the present invention, a method and system is provided to readily and precisely determine the optical characteristics of an optical component without requiring the use of an optical network analyzer comprised of optically inert components having very small measurement uncertainties.

In accordance with the present invention, a plurality of interferometric measurements for a control optical element using first polarized lightwaves of a first amplitude and second polarized lightwaves of a second amplitude are received in accordance with the invention. Next, a calibration result is derived using the plurality of interferometric measurements in accordance with the present invention. With this calibration result, the optical properties of a device under test (DUT) measured using the first polarized lightwaves of the first amplitude and the second polarized lightwaves of the second amplitude can be determined with reduced uncertainty due to intrinsic optical characteristics of the interferometric optical network analyzer.

These and other technical features of the present invention will no doubt become obvious to those skilled in the art after having read the following detailed description of the embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

The drawings referred to in this description should be understood as not being drawn to scale except if specifically noted.

DETAILED DESCRIPTION OF THE INVENTION

Reference will now be made in detail to the embodiments of the invention, examples of which are illustrated in the accompanying drawings. While the invention will be described in conjunction with the embodiments, it will be understood that they are not intended to limit the invention to these embodiments. On the contrary, the invention is intended to cover alternatives, modifications and equivalents, which may be included within the scope of the invention as defined by the appended claims. Furthermore, in the following detailed description of the present invention, numerous specific details are set forth in order to provide a thorough understanding of the present invention. However, the present invention may be practiced without these specific details. In other instances, well known methods, procedures, components, and circuits have not been described in detail as not to unnecessarily obscure aspects of the present invention.

As an overview, and as will be described below in detail, various embodiments of the present invention provide a method and system to determine the intrinsic optical characteristics and corresponding uncertainties associated with an interferometric optical network analyzer. In one embodiment, the present invention is able to determine the aforementioned intrinsic optical characteristics using a calibration result derived from at least two interferometric measurements of a control optical component. As a result, corresponding uncertainties can then be extracted from measurements taken from a device-under-test (DUT). In so doing, various embodiments of the present invention enable measuring of the polarization-resolved transfer function of a DUT. As will also be described in detail below, various embodiments of the present invention eliminate the need to compose the optical network analyzer of optically inert components having very small measurement uncertainties associated therewith. For purposes of the present application, the term calibration result is intended to refer to a result, or plurality of results, derived at least partially, interferometrically, which allow one to determine and account for intrinsic characteristics of an interferometric optical network analyzer and thereby obtain accurate measurements of a device under test.

INTERFEROMETRIC OPTICAL NETWORK ANALYZER AND CALIBRATION SYSTEM ARCHITECTURE

Figure 1:
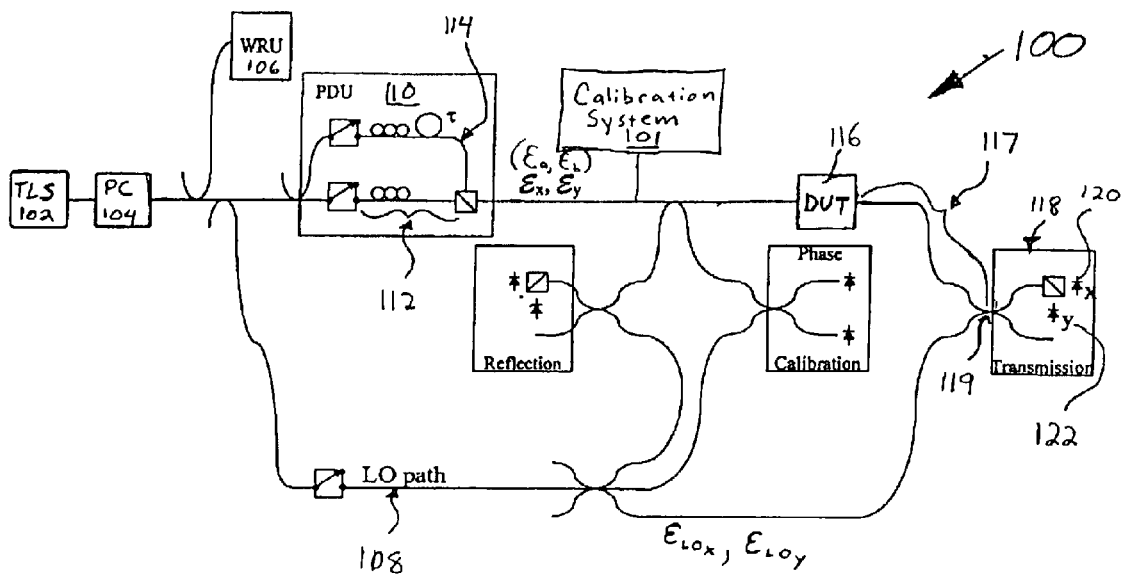
FIG. 1 is a schematic diagram of an interferometric optical network analyzer having a calibration system integral therewith in accordance with various embodiments of the present invention.

With reference now to FIG. 1, a schematic diagram of an interferometric optical network analyzer 100 including a calibration system component 101 in accordance with various embodiments of the present invention is shown. In accordance with one embodiment of the present invention, calibration system 101 determines the intrinsic optical characteristics and corresponding uncertainties associated with interferometric optical network analyzer 100. As a result, such known uncertainties can then be removed from measurements taken from a device-under-test (DUT). Hence, the present embodiment is then able to precisely determine the optical characteristics of an optical component. A detailed discussion of the operation of calibration system 101 is given below under the heading "CALIBRATION METHOD".

Figure 2A:
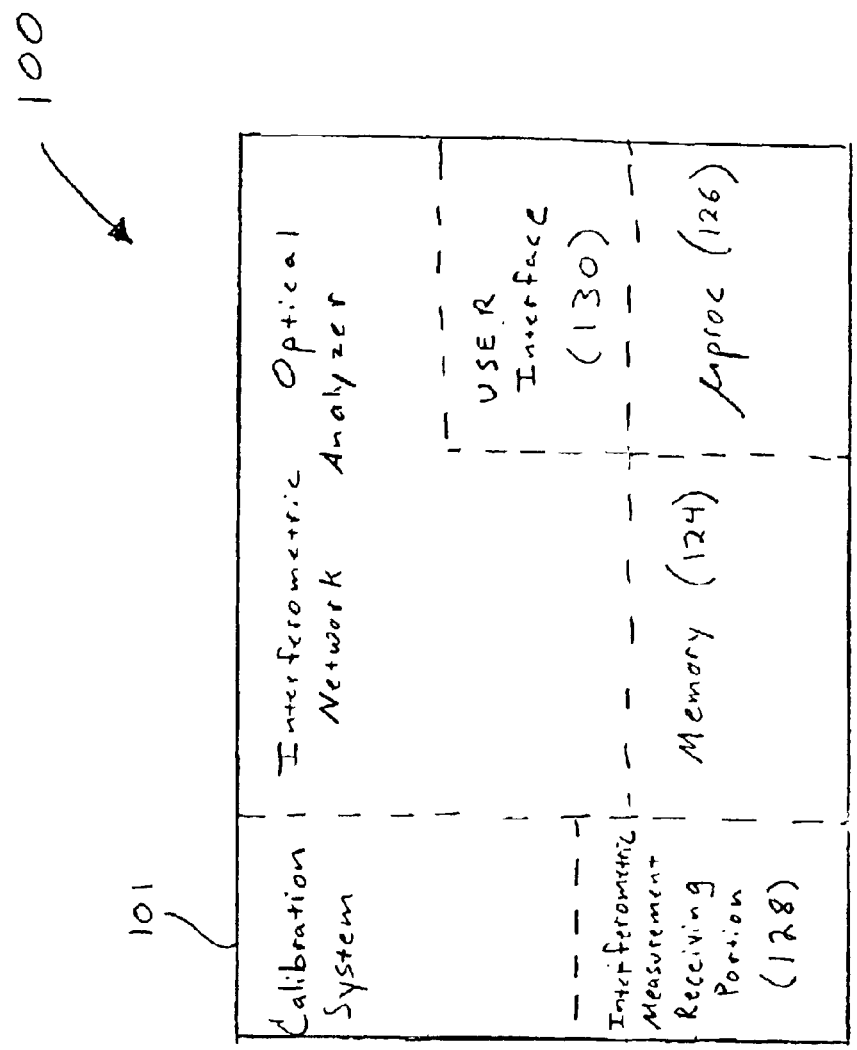
FIG. 2A is a block diagram of a calibration system and an interferometric optical network analyzer in which the calibration system is integral with the interferometric optical network analyzer in accordance with one embodiment of the present invention.

In one embodiment, such as the embodiment shown in FIG. 1 and schematically depicted in the block diagram of FIG. 2A, calibration system 101 is integral with an interferometric optical network analyzer 100. In one such embodiment, calibration system 101 is comprised of computer-readable instructions for causing a processor 126 of interferometric optical network analyzer 100 to perform calibration steps which are described in detail below. In such an approach, the computer readable instructions are stored in a computer readable medium, for example, in memory 124 resident in interferometric optical network analyzer 100, and are executed by processor 126. Instructions executed by processor 126 may be stored in and carried through one or more computer-readable media, which refer to any medium from which a computer reads information. Computer-readable media may be, for example, a floppy disk, a hard disk, a zip-drive cartridge, or various other memory means not listed herein for purposes of brevity. Computer-readable media may also be coaxial cables, copper wire, fiber optics, acoustic, or lightwaves, etc. As an example, the instructions to be executed by processor 126 are in the form of one or more software programs and are initially stored in a CD-ROM being interfaced with calibration system 101.

Calibration system 101 of the present embodiment also includes an interferometric measurement receiving portion 128, and a user interface 130. In one embodiment, user interface 130 provides data to the user via a video interface. In another embodiment, user interface 130 provides data to the user via an audio interface. In yet another embodiment, user interface 130 provides data to the user via a textual interface. Although such outputs are recited above, the embodiments of the present invention are well suited to use with various user interfaces both for providing data to a user, and for receiving data or commands from a user.

Figure 2B:
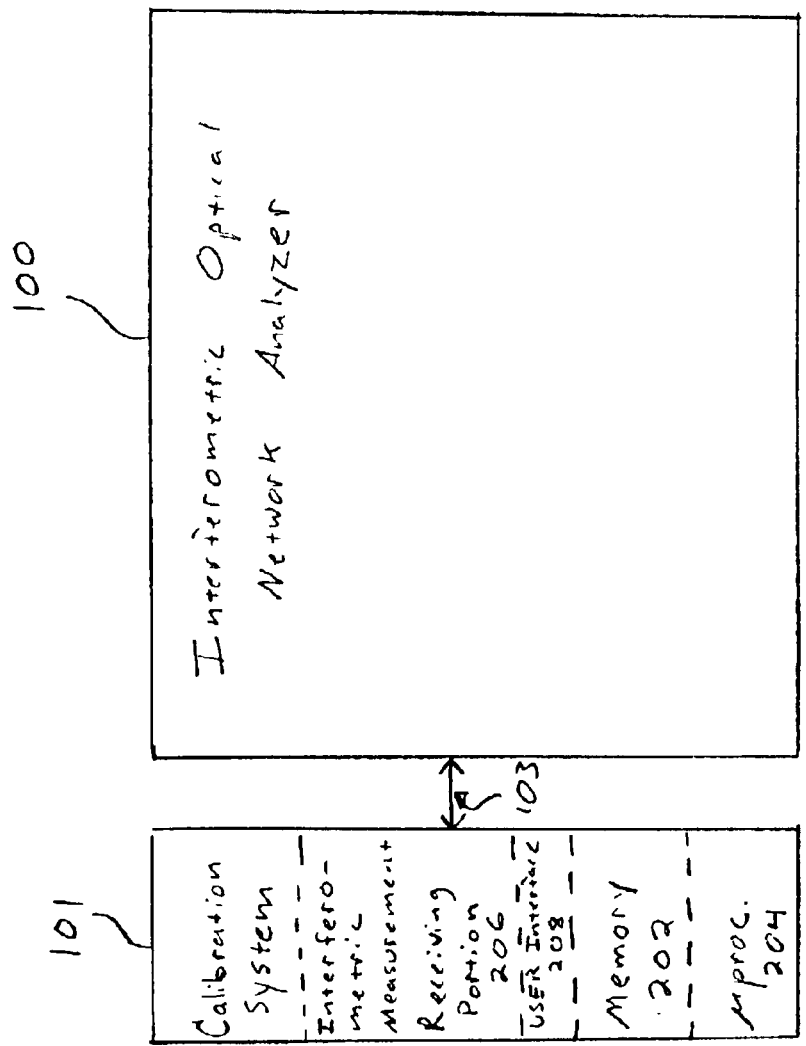
FIG. 2B is a block diagram of a calibration system and an interferometric optical network analyzer in which the calibration system is not integral with the interferometric optical network analyzer in accordance with one embodiment of the present invention.

With reference now to the block diagram of FIG. 2B, another embodiment of the present invention is schematically depicted in which calibration system 101 is not integral with interferometric optical network analyzer 100. In such an embodiment, calibration system 101 is a standalone unit capable of being coupled to interferometric optical network analyzer 100. In one such embodiment, calibration system 101 is not optically coupled to interferometric optical network analyzer 100. Instead, calibration system 101 of FIG. 2B, is communicatively coupled, via, for example, communication link 103, with interferometric optical network analyzer 100 to exchange data therewith. Such data may include, for example, interferometric measurements, calibration results, and the like.

In the present embodiment, calibration system 101 is comprised of computer-readable instructions for causing a processor to perform the calibration steps which are described in detail below. In the embodiment schematically depicted in FIG. 2B, the computer readable instructions are stored, for example, in memory 202 of calibration system 101, and are executed by processor 204 of calibration system 101. Additionally, calibration system 101 of the present embodiment includes an interferometric measurement receiving portion 206, and a user interface 208. Although specific embodiments are depicted in FIG. 2A and FIG. 2B, the present invention is well suited to various other embodiments in which, for example, calibration system 101 is partially integral with interferometric optical network analyzer 100, is comprised of hardware, is comprised of firmware, or any combination thereof. That is, the present invention is well suited to various physical implementations which ultimately enable the performance of the calibration method described in detail below.

With reference again to FIG. 1, although described briefly herein, a detailed description of a prior interferometric optical network analyzer, which does not include calibration system 101, is found in commonly-owned, co-pending United States Patent Application entitled "Interferometric Optical Component Analyzer Based on Orthogonal Filters", by Szafraniec et al. filed Aug. 22, 2001 and having U.S. Ser. No. 09/938,100 which is incorporated herein by reference as background material. Additional information regarding an interferometric optical network analyzer, which does not include calibration system 101, is found in commonly-owned, co-pending United States Patent Application entitled "Determination of Properties of an Optical Device", by Rosenfeldt et al. filed Aug. 28, 2001 and having U.S. Ser. No. 09/940,741 which is incorporated herein by reference as background material.

As shown in FIG. 1, calibration system 101 is coupled to an interferometric optical network analyzer in which light from a tunable laser source (TLS) 102 is initially sent through a polarization controller 104. A fraction of the light is directed to a wavelength reference unit (WRU) 106, which tracks the frequency sweep of TLS 102. The light on the main path is again split with approximately half of the light being directed to a local oscillator (LO) path 108. The remaining light in the main path is again split once more in a polarization delay unit (PDU) 110. The two lightwaves are recombined with mutually orthogonal polarizations. For purposes of the following discussion, the light from the shorter path 112 is designated as being x-polarized, and is represented by the lightwave, $\epsilon_x$. Light passing through the longer path, 114, is designated as being y-polarized as is represented by the lightwave $\epsilon_y$. It should be understood that $\epsilon_x = E_x e^{i\omega t}$ where $E_x$ is the amplitude of the x-polarized lightwaves, and $\epsilon_y = E_y e^{i\omega t}$ where $E_y$ is the amplitude of the y-polarized lightwaves, $\omega$ is the angular optical frequency of the light and where t corresponds to time.

With reference still to FIG. 1, to measure the transmissive properties of the DUT 116, data from the transmission receiver 118 is analyzed. The x-polarized components of the lightwaves that interfere in transmission receiver 118 are directed toward the x-photodetector 120, while the y-polarized components are directed toward the y-photodetector 122. In the present embodiment, each of the two detectors, 120 and 122, will measure two interference signals of interest, each with a different beat frequency. For example, one interference signal detected on y-photodetector 122 will be proportional to $E_y E_{LOy} U_{22}$, where $E_y$, $E_{LOy}$ are real amplitudes of the electric fields. $U_{22}$ is the fourth element of the transfer function matrix, U, corresponding to the path including the DUT, the coupler following the DUT, and the optical path leading to the photodetectors. Intrinsic optical characteristics, such as intrinsic PDL or PMD, located along a portion of the above path (i.e. the coupler following the DUT, and the optical path leading to the photodetectors) lead to measurement uncertainties which conventionally reduce the precision with which a DUT can be measured. As will be described in detail below, in one embodiment of the present invention, calibration system 101 determines the intrinsic optical characteristics associated with the aforementioned path and thereby enables a precise determination of the optical characteristics of a DUT.

CALIBRATION METHOD

A. Two Step Approach

This calibration method is referred to as a "two step" approach because a minimum of two interferometric measurement steps are required. Additionally, the following two step calibration approach is based upon the assumption the that initial polarizations launched into DUT 116 are orthogonal. That is, the assumption is made that $E_x$ and $E_y$ of FIG. 1 are orthogonal. The present embodiment, however, is also well suited to use when the initial polarizations launched into DUT 116 are not entirely orthogonal. Subsequent subsection "B." entitled "Three Step Approach", on the other hand, is explicitly directed to the case where $\epsilon_x$ and $\epsilon_y$ are not entirely orthogonal when launched into DUT 116. As will be described in the following section, in order to calibrate interferometric optical network analyzer 100, it is necessary to determine the intrinsic optical characteristics associated therewith. That is, the present calibration method enables a quantitative determination of the intrinsic uncertainty attributable to the optical path including the coupler 119 following the DUT, and the optical path 117 leading to the photodetectors 120 and 122. This quantitative determination can then be used to calibrate interferometric optical network analyzer 100 such that a precise determination of the optical characteristics of an optical component (i.e. DUT) can be made.

As stated above, U represents a transfer function matrix which corresponds to the optical path including the DUT 116, a coupler 119 following the DUT, and the optical path 117 leading to the photodetectors 120 and 122. The present calibration method represents the transfer function matrix, U, as a product of a transfer function matrix, J, associated with DUT 116, and a separate transfer function matrix, P, associated with the coupler 119 following DUT 116 and the optical path 117 to photodetectors 120 and 122. Thus, it can be stated that:

$$U = PJ. \qquad (1)$$

The matrix, J, is essentially a Jones matrix with additional information about the relative phase between input and output lightwaves from the DUT 116. From this matrix, J, the transmissivity or reflectivity, insertion loss, polarization dependent loss (PDL), group delay, polarization mode dispersion (PMD), and chromatic dispersion of DUT 116 can all be readily calculated. Such calculations are described, for example, in B. L. Heffner, "Deterministic, analytically complete measurement of polarization dependent transmission through optical devices," IEEE Photon. Technol. Lett., vol. 4, pp. 451–454, 1992, and also in B. L. Heffner, "Automated measurement of polarization mode dispersion using Jones matrix eigenanalysis," IEEE Photon. Technol. Lett., vol. 4, pp. 1066–1069, 1992. Both of the above-listed articles are hereby incorporated by reference as background material.

Moreover, in one embodiment, upon completion of the present calibration method, the present invention enables the determination of a polarization-resolved transfer function matrix corresponding to the DUT. As a result, the optical characteristics of the DUT can be precisely determined without uncertainties intrinsic to interferometric optical network analyzer 100. To accomplish this task, the present calibration method will ultimately obtain a matrix from measurements (a minimum of two measurements in the present embodiment) of interference signals involving terms proportional to the elements of the transfer function matrix, U, and the amplitudes of the stimulating lightwaves to $E_y$, $E_x$, $E_{LOx}$, and $E_{LOy}$.

Figure 3:
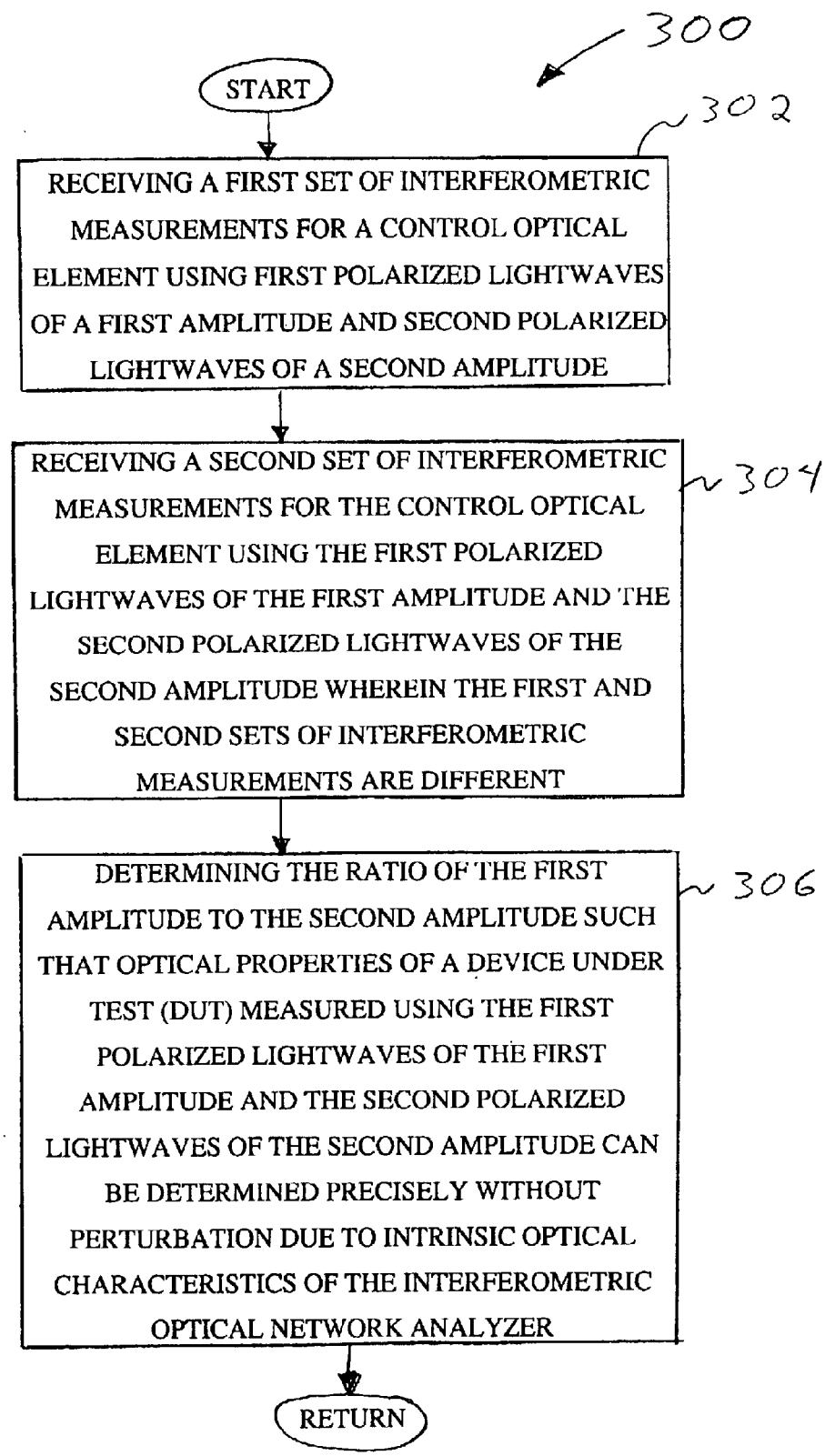
FIG. 3 is a flow chart of calibration steps performed in accordance with a two step approach embodiment of the present invention.

With reference now to FIG. 3, a flow chart 300 of steps performed in accordance with one embodiment of the present invention is shown. The steps of FIG. 3 will also be described in conjunction with FIG. 1. At step 302, the present calibration system receives a first set of interferometric measurements ($E_x E_{LOx} U_{11}$, $E_y E_{LOx} U_{12}$, $E_x E_{LOy} U_{21}$, and $E_y E_{LOy} U_{22}$) for a control optical component whose transfer function matrix is defined as A. In one embodiment, the control optical component is comprised of a patchcord. By using a patchcord having no polarization dependent loss (PDL), the transfer function matrix, A, is unitary. By definition, a unitary matrix has a determinant of 1. Although such a control optical component is used in the present embodiment, the present calibration method is also well suited to using various other types of optical components as the control optical component.

In one implementation, calibration system 101 of FIG. 1 receives the first set of interferometric measurements after a user couples the control optical component (e.g. a patchcord disposed in a first position) to interferometric optical network analyzer 100 and initiates a measurement process.

Referring still to step 302, from the received first set of interferometric measurements, calibration system 101 constructs a matrix, W, shown below at (2).

$$W = \begin{pmatrix} E_x E_{LOx} U_{11} & E_y E_{LOx} U_{12} \\ E_x E_{LOy} U_{21} & E_y E_{LOy} U_{22} \end{pmatrix} \qquad (2)$$

In equation (2) above, for the measurements received at step 302, U=PA. Furthermore, the four elements of matrix, W, are complex numbers which are known by calibration system 101. At this time, however, the values for any of the individual field amplitudes ($E_x$, $E_y$, $E_{LOx}$, and $E_{LOy}$) or individual matrix elements ($U_{11}$, $U_{12}$, $U_{21}$, and $U_{22}$) are not known.

With reference now to step 304 of FIG. 3, the second step in the two step approach is performed. At step 304, the present calibration system receives a second set of interferometric measurements ($E_x E_{LOx} T_{11}$, $E_y E_{LOx} T_{12}$, $E_x E_{LOy} T_{21}$ and $E_y E_{LOy} T_{22}$) for a control optical component whose transfer function matrix is defined as B. In one embodiment, the control optical component is again comprised of a patchcord such that the transfer function matrix, B, is unitary. Moreover, in one embodiment, the control optical component is comprised of the same patchcord, but the patchcord is arranged in a position different from the position in which it was disposed during the first set of measurements received at step 302. In such an embodiment, the difference in the position of the patchcord must be sufficient to render the transfer function matrix B different than transfer function matrix A, but still unitary.

As a further explanation, in one embodiment, the first position of the patchcord is, for example, a length of patchcord arranged in a roll, pile, line, etc. on a table. To obtain the second position for the patchcord, a user or mechanism adjusts the position of the patchcord by, for example, twisting, flipping rearranging or otherwise altering the physical orientation of the patchcord. In so doing, the same patchcord (or other control optical component) can be used to provide both a first transfer function matrix, A, and a second transfer function matrix, B. Once again, although such a control optical component is used in the present embodiment, the present calibration method is also well suited to using various other types of optical components as the control optical component.

Referring still to step 304, from the received second set of interferometric measurements, calibration system 101 constructs a matrix Z shown below at (3).

$$Z = \begin{pmatrix} E_x E_{LOx} T_{11} & E_y E_{LOx} T_{12} \\ E_x E_{LOy} T_{21} & E_y E_{LOy} T_{22} \end{pmatrix} \qquad (3)$$

In equation (3) above, for the measurements received at step 304, T=PB. Also, the four elements of matrix Z are complex numbers. At this time, however, the values for any of the field amplitudes ($E_x$, $E_y$, $E_{LOx}$, and $E_{LOy}$) or matrix elements ($T_{11}$, $T_{12}$, $T_{21}$, and $T_{22}$) are not known.

In the present embodiment, calibration system 101 then computes the following:

$$W^{-1}Z = \frac{1}{E_x E_y E_{LOx} E_{LOy} \det(U)} \times \qquad (4)$$

$$\begin{pmatrix} E_x E_y E_{LOx} E_{LOy} (T_{11} U_{22} - T_{21} U_{12}) & E_y^2 E_{LOy} E_{LOx} (T_{12} U_{22} - T_{22} U_{12}) \\ E_x^2 E_{LOx} E_{LOy} (T_{21} U_{11} - T_{11} U_{21}) & E_x E_y E_{LOx} E_{LOy} (T_{22} U_{11} - T_{12} U_{21}) \end{pmatrix}.$$

From equation (4), the following solution is obtained.

$$W^{-1}Z = \frac{1}{\det(U)} \begin{pmatrix} (T_{11} U_{22} - T_{21} U_{12}) & \frac{E_y}{E_x}(T_{12} U_{22} - T_{22} U_{12}) \\ \frac{E_x}{E_y}(T_{21} U_{11} - T_{11} U_{21}) & T_{22} U_{11} - T_{12} U_{21} \end{pmatrix} \qquad (5)$$

As stated above, U=PA and T=PB where both A and B are unitary. Because a matrix multiplied by its inverse is equal to one, the following statement is true.

$$U^{-1}T = A^{-1}P^{-1}PB = A^{-1}(1)B = A^{-1}B \qquad (6)$$

It can be shown that $$U^{-1}T = A^{-1}B \qquad (7)$$

$$= \frac{1}{\det(U)} \begin{pmatrix} (T_{11} U_{22} - T_{21} U_{12}) & (T_{12} U_{22} - T_{22} U_{12}) \\ (T_{21} U_{11} - T_{11} U_{21}) & (T_{22} U_{11} - T_{12} U_{21}) \end{pmatrix}.$$

Because both A and B are unitary, the following is also true.

$$A^{-1}B = \exp(i\varphi) \begin{pmatrix} a & b \\ -b^* & a^* \end{pmatrix} \qquad (8)$$

Because $A^{-1}B$ and $U^{-1}T$ are both unitary, it follows that $$\frac{|T_{12} U_{22} - T_{22} U_{12}|}{|T_{21} U_{11} - T_{11} U_{21}|} = 1. \qquad (9)$$

Next, as recited in step 306 of FIG. 3, calibration system 101 uses the results of (9) in conjunction with (5) to determine the ratio, R, of $E_y$ and $E_x$. More specifically, in the present embodiment, calibration system 101 divides the absolute values of the complex numbers of the off-diagonal elements of $W^{-1}Z$. Using this approach in combination with (9), calibration system 101 derives the following result in the present embodiment.

$$R = \sqrt{\frac{\left|\frac{E_y}{E_x}(T_{12}U_{22} - T_{22}U_{12})\right|}{\left|\frac{E_x}{E_y}(T_{21}U_{11} - T_{11}U_{21})\right|}} = \frac{E_y}{E_x} \quad (10)$$

In (10), R will be a function of the wavelength of the light used to obtain the first and second set of interferometric measurements of the control optical element. However, the wavelength of the light used to obtain the first and second set of interferometric measurements of the control optical element will be a known value. Referring again to step 306 of FIG. 3, as will be shown below, by determining the ratio, R, the present embodiment has achieved a precise calibration of the interferometric optical network analyzer. More specifically, by knowing the value of R, a polarization-resolved transfer function matrix for a given DUT can now be determined. Stated differently, using the method and system of the present embodiment, a DUT can now be measured without having any of the uncertainties associated with or intrinsic to the interferometric optical network analyzer affect the measurement of the DUT.

Figure 4:
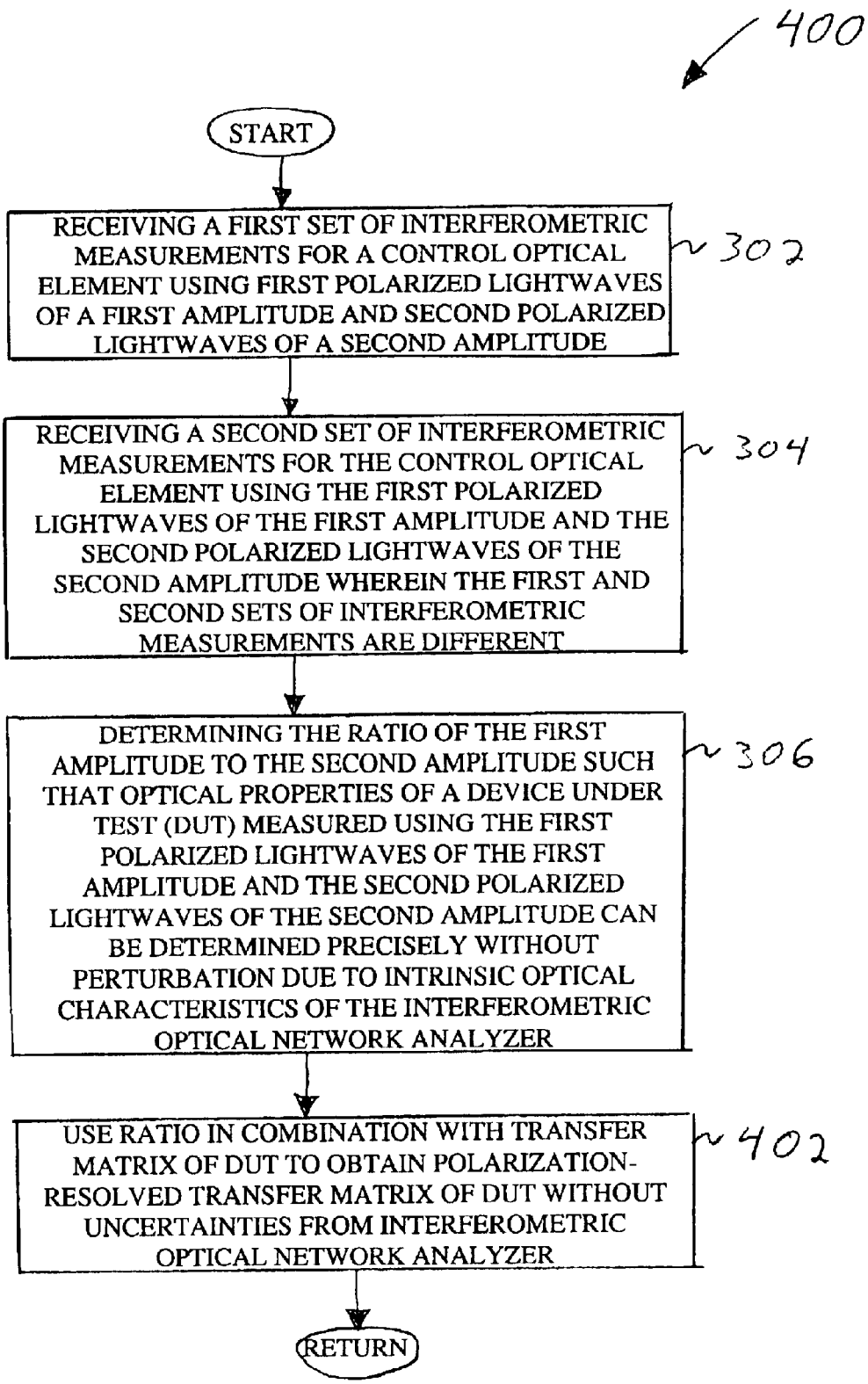
FIG. 4 is a flow chart of device-under-test (DUT) measurement steps performed in accordance with a two step approach embodiment of the present invention.

To further illustrate, after obtaining the ratio, R, of $E_y$ and $E_x$, a DUT replaces the control optical element (e.g. a patchcord) used to obtain the first and second set of interferometric measurements. It is assumed, in this embodiment, that the electric-field amplitudes remain the same as they were when the first and second set of interferometric measurements of the control optical element were taken. The DUT measurement step is shown as step 402 in flow chart 400 of FIG. 4. It will be seen that steps 302, 304, and 306 of FIG. 4 are the same as those in FIG. 3, and a discussion of those steps is not repeated herein for purposes of brevity. Thus, as recited in step 402 of FIG. 4, the present embodiment receives interferometric measurements of a DUT on a calibrated interferometric optical network analyzer. For purposes of the present embodiment, a calibrated interferometric optical network analyzer is one for which steps 302–306 of FIG. 3 have been performed.

Referring still to step 402, from the received interferometric measurements of the DUT, calibration system 101 of the present embodiment obtains the matrix D shown below at (11).

$$D = \begin{pmatrix} E_x E_{LOx} V_{11} & E_y E_{LOx} V_{12} \\ E_x E_{LOy} V_{21} & E_y E_{LOy} V_{22} \end{pmatrix} \quad (11)$$

The four elements of matrix D are complex numbers. At this time, however, the values for any of the individual field amplitudes ($E_x$, $E_y$, $E_{LOx}$, and $E_{LOy}$) or individual matrix elements ($V_{11}$, $V_{12}$, $V_{21}$, and $V_{22}$) are not known. Also, in the above matrix D, V=PJ, where P is the transfer function matrix corresponding to the coupler following the DUT (e.g. DUT 116 of FIG. 1) and the optical path 117 to photodetectors 120 and 122 also of FIG. 1. In this embodiment, a transfer function matrix describes the optical properties of the DUT. Transfer function matrix J is essentially a Jones matrix with additional information about the relative phase of the input and output lightwaves of the DUT 116.

Using the earlier derived matrix, W, the present embodiment then generates a new matrix shown below at (12).

$$W^{-1}D = \frac{1}{\det(U)} \begin{pmatrix} (V_{11}U_{22} - V_{21}U_{12}) & \frac{E_y}{E_x}(V_{12}U_{22} - V_{22}U_{12}) \\ \frac{E_x}{E_y}(V_{21}U_{11} - T_{11}U_{21}) & (V_{22}U_{11} - V_{12}U_{21}) \end{pmatrix} \quad (12)$$

The present embodiment then uses the ratio, R, of $E_y$ to $E_x$ which was ultimately derived above at (10) in the following manner. The lower-left element of matrix (12) is multiplied by this ratio while the upper-right element of matrix (12) is divided by this ratio. This process obtains a new matrix which is equal to $U^{-1}V$. Furthermore, because a matrix multiplied by its inverse is equal to one, the following statement is true.

$$U^{-1}V = A^{-1}P^{-1}PJ = A^{-1}(1)J = A^{-1}J \quad (13)$$

Hence, the present embodiment is then able to derive a solution for the matrix $A^{-1}J$. Because A is unitary and has no PMD, the matrix $A^{-1}J$ describes exactly the same optical properties as the matrix J. These properties include, for example, the transmissivity or reflectivity, insertion loss, polarization dependent loss (PDL), group delay, polarization mode dispersion (PMD), and chromatic dispersion of the DUT. Thus, the present embodiment enables determination of a polarization-resolved transfer function of a DUT.

In the present embodiment, the calibration result derived by the present calibration system is comprised of the ratio, R, of $E_y$ and $E_x$, and the matrix W. That is, for purposes of clarity, the above description of the present calibration method derives a particular calibration result (i.e. the ratio, R, of $E_y$ and $E_x$, and the matrix W), but the present invention is not limited to the derivation of such a particular calibration result. Hence, it should be understood, that the present invention is also well suited to deriving various other calibration results and using those calibration results to determine the optical properties of the DUT. These and other calibration results may include, for example, the amplitudes of the lightwaves $E_x$ and $E_y$, rather than their ratio. An alternative calibration result might include all of the lightwave amplitudes, $E_x$, $E_y$, $E_{LOx}$, $E_{LOy}$, the overlap parameter σ (as will be described in detail below), but no matrix W. That is, the present invention is well suited to obtaining and using various other types of calibration results which are derived, for example, using a plurality of interferometric measurements of a control optical element. Furthermore, a variety of mathematical techniques to obtain these calibration results are possible. More specifically, one particular analytic derivation was utilized in the embodiment described above, but it is also true that a multitude of different mathematical steps would enable derivation of the same calibration results. Additionally, totally distinct approaches for solving for the same calibration results are possible. In particular, a numerical or symbolic calculation could have been performed with a computer, rather than the analytic method described above.

Also, as stated above, for purposes of the present application, the term calibration result is intended to refer to a result, or plurality of results, derived at least partially interferometrically, which allow one to determine and account for intrinsic characteristics of an interferometric optical network analyzer and thereby obtain accurate measurements of a device under test.

Further, the optical properties of the DUT (using the transfer function matrix $A^{-1}J$) can be determined with reduced error or uncertainty attributable to the intrinsic optical characteristics and corresponding uncertainty of the interferometric optical network analyzer. Also, because the present embodiment is able to calibrate the interferometric optical network analyzer using the method described in conjunction with steps 302–306 of FIG. 3, the present embodiment eliminates the need for very expensive and optically inert components within the interferometric optical network analyzer. Instead, the present embodiment allows the interferometric optical network analyzer to be comprised of less expensive components and then compensates for any uncertainties caused thereby using the calibration method of FIG. 3.

As yet an additional benefit, the present embodiment is able to obtain the optical properties of the DUT with only two interferometric calibration measurements. Also, the calibration method of the present embodiment, as performed by calibration system 101 of FIG. 1, does not require excessive special training of or place severe technical demands on an end user. Thus, the present embodiment provides a method and system to readily determine the optical characteristics of an optical component. Various embodiments of the present invention further provide a method and system which achieve the above accomplishment and can precisely determine the optical characteristics of an optical component. Various embodiments of the present invention also provide a method and system which achieve the above accomplishments and which do not require the use of an optical network analyzer comprised of optically inert components having very small measurement uncertainties associated therewith.

B. Three Step Approach

This calibration method is referred to as a "three step" approach because a minimum of three interferometric measurement steps are required. Additionally, the following three step calibration approach is based upon the assumption that initial polarizations launched into DUT 116 are not entirely orthogonal. That is, the assumption is made that $\epsilon_a$ and $\epsilon_b$ of FIG. 1 are not completely orthogonal when launched into DUT 116. In such an instance, instead of launching two lightwaves polarized as shown in (14), $$\begin{pmatrix} \varepsilon_a \\ 0 \end{pmatrix}, \begin{pmatrix} 0 \\ \varepsilon_b \end{pmatrix} \tag{14}$$

two delayed lightwaves are actually launched into the optical component (e.g. the test optical component and/or the DUT) as described in (15), where σ is the overlap parameter.

$$\begin{pmatrix} \varepsilon_a \\ 0 \end{pmatrix}, \begin{pmatrix} \sigma\varepsilon_b \\ \varepsilon_b \end{pmatrix} \tag{15}$$

The lack of complete orthogonality may be, for example, due to PDL that exists in the interferometric optical network analyzer between PDU 110 and the DUT 116, all of FIG. 1.

Figure 5:
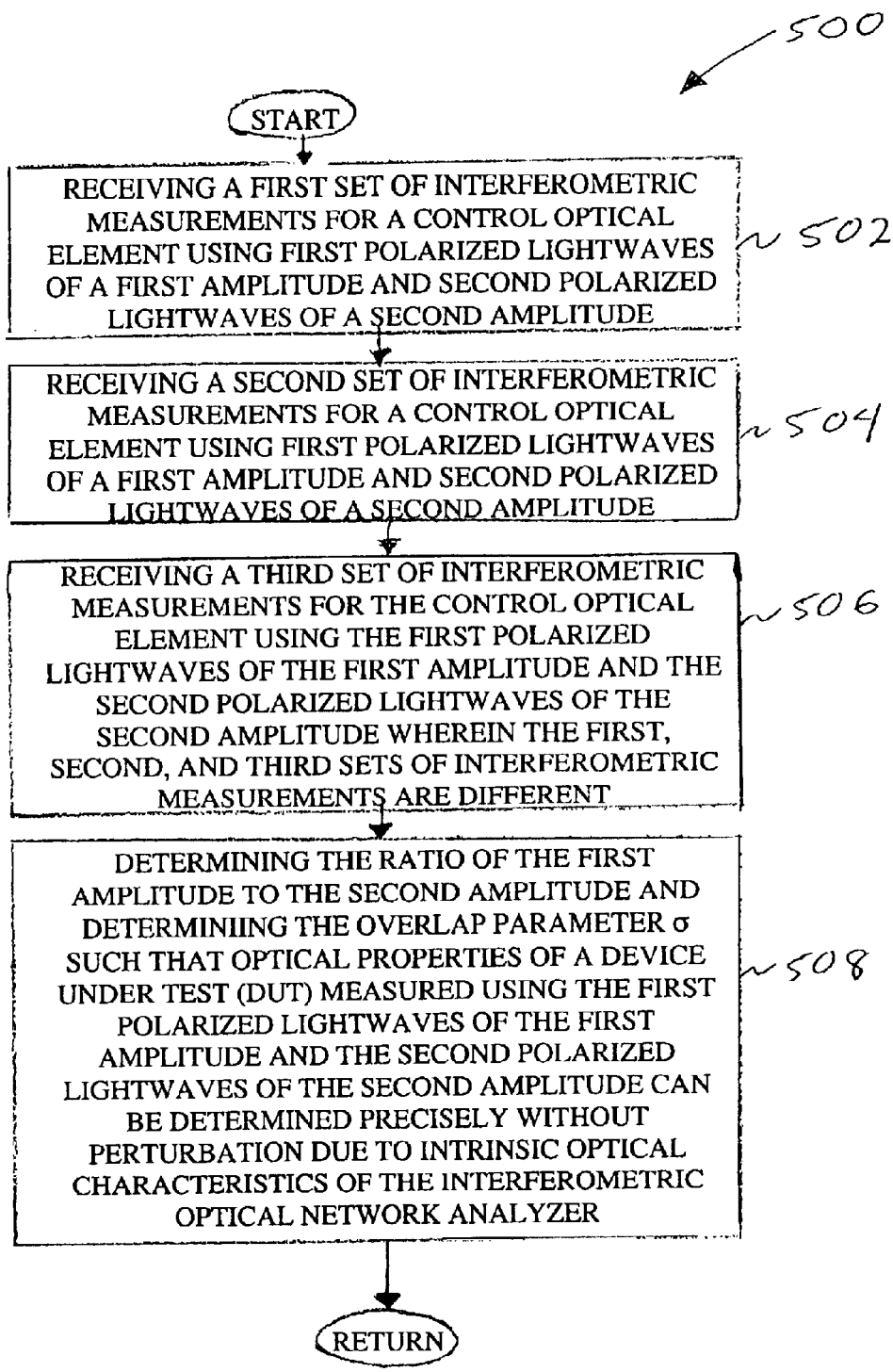
FIG. 5 is a flow chart of calibration steps performed in accordance with a three step approach embodiment of the present invention.

With reference now to FIG. 5, a flow chart 500 of steps performed in accordance with one embodiment of the present invention is shown. Similar to the above-described two step approach, the present calibration method enables a quantitative correction of measurement errors attributable to the intrinsic properties of the optical path including the coupler 119 following the DUT and the optical path 117 leading to the photodetectors 120 and 122. Calibration results obtained from measurements of the optical network analyzer's intrinsic properties are used to calibrate interferometric optical network analyzer 100 such that a precise determination of the optical characteristics of an optical component (i.e. DUT) can be made. Also, the following discussion of the present three step approach will have many aspects in common with the above-described two step approach, for purposes of brevity and clarity, some of the common description will not be repeated herein.

With reference now to step 502, the present calibration system receives a first set of interferometric measurements for a control optical component. In one embodiment, the control optical component is comprised of a patchcord. By using a patchcord having no polarization dependent loss (PDL), the transfer function matrix is unitary. By definition, a unitary matrix has a determinant of 1. Although such a control optical component is used in the present embodiment, the present calibration method is also well suited to using various other types of optical components (e.g. the DUT itself) as the control optical component to determine both the ratio, R, of $E_x$ and $E_y$, and the overlap parameter σ.

In one implementation, calibration system 101 of FIG. 1 receives the first set of interferometric measurements after a user couples the control optical component (e.g. a patchcord disposed in a first position) to interferometric optical network analyzer 100 and initiates a measurement process.

Referring still to step 502, in the present embodiment, in which the initial polarizations launched into DUT 116 are not entirely orthogonal, instead of obtaining a matrix of the form given in (2) above, the present embodiment obtains a matrix having the form shown below at (16).

$$e^{i\theta_1} \begin{pmatrix} U_{11}E_a E_{LOx} & (U_{12} + \sigma U_{11})E_b E_{LOx} \\ U_{21}E_a E_{LOy} & (U_{22} + \sigma U_{21})E_b E_{LOy} \end{pmatrix} \tag{16}$$

In order to obtain the measurement desired of the form shown at (17), $$\begin{pmatrix} U_{11} & U_{12} \\ U_{21} & U_{22} \end{pmatrix} = U = PA \tag{17}$$

calibration system 101 of the present embodiment must solve for the electric field amplitudes ($E_a$, $E_b$, $E_{LOx}$, and $E_{LOy}$), and must also solve for the overlap parameter, σ. Referring still to step 502, the present embodiment first obtains the matrix (16) using a control optical element (e.g. a patchcord). This is the first step of the present three step approach.

Referring now to step 504 of FIG. 5, the present embodiment then performs the second step in the three step approach. At step 504, the present calibration system receives a second set of interferometric measurements for a control optical component. In one embodiment, the control optical component is again comprised of a patchcord such that its transfer function matrix is unitary. Moreover, in one embodiment, the control optical component is comprised of the same patchcord, but the patchcord is arranged in a position different from the position in which it was disposed during the first set of measurements received at step 502. In such an embodiment, the difference in the position of the patchcord must be sufficient to render the transfer function matrix of the patchcord at the second step different from transfer function matrix received at the first step, but still unitary.

As a further explanation, in one embodiment, the first position of the patchcord is, for example, a length of patchcord arranged in a roll, pile, line, etc. on a table. To obtain the second position for the patchcord, a user or mechanism adjusts the position of the patchcord by, for example, twisting, flipping rearranging or otherwise altering the physical orientation of the patchcord. In so doing, the same patchcord (or other control optical component) can be used to provide both a first transfer function matrix, A, and a second transfer function matrix, B. The transfer function matrix, P, corresponds to the coupler following DUT 116 and the optical path 117 to photodetectors 120 and 122. Once again, although such a control optical component is used in the present embodiment, the present calibration method is also well suited to using various other types of optical components as the control optical component.

Referring still to step 504, from the received second set of interferometric measurements, calibration system 101 constructs a matrix listed below at (18).

$$e^{i\theta_2}\begin{pmatrix} T_{11}E_aE_{LOx} & (T_{12}+\sigma T_{11})E_bE_{LOx} \\ T_{21}E_aE_{LOy} & (T_{22}+\sigma T_{21})E_bE_{LOy} \end{pmatrix} \quad (18)$$

Referring next to step 506, in the third of the present three step approach, calibration system 101 of the present embodiment receives a third set of interferometric measurements for a control optical component. In one embodiment, the control optical component is again comprised of a patchcord such that its transfer function matrix is unitary. Moreover, in one embodiment, the control optical component is comprised of the same patchcord, but the patchcord is arranged in a third position different from the prior first and second positions in which it was disposed during the first and second set of measurements received at steps 502 and 504, respectively. In such an embodiment, the difference in the position of the patchcord must be sufficient to render the transfer function matrix of the patchcord at the third step different from transfer function matrix received at the first and second steps, but still unitary. Once again, although such a control optical component is used in the present embodiment, the present calibration method is also well suited to using various other types of optical components as the control optical component.

Referring still to step 506, from the received third set of interferometric measurements, calibration system 101 constructs a matrix set forth below at (19).

$$e^{i\theta_3}\begin{pmatrix} V_{11}E_aE_{LOx} & (V_{12}+\sigma V_{11})E_bE_{LOx} \\ V_{21}E_aE_{LOy} & (V_{22}+\sigma V_{21})E_bE_{LOy} \end{pmatrix} \quad (19)$$

After obtaining the matrices shown at (16), (18), and (19), the present embodiment then multiplies matrix (18) by the inverse of matrix (16). The resulting product is shown as (20).

$$e^{i(\theta_2-\theta_1)}\frac{\begin{pmatrix} (U_{22}+\sigma U_{21})E_bE_{LOy} & -(U_{12}+\sigma U_{11})E_bE_{LOx} \\ -U_{21}E_bE_{LOy} & U_{11}E_aE_{LOx} \end{pmatrix}}{E_aE_bE_{LOy}E_{LOb}(U_{11}U_{21}-U_{12}U_{21})} \quad (20)$$

$$\begin{pmatrix} T_{11}E_aE_{LOx} & (T_{12}+\sigma T_{11})E_bE_{LOx} \\ T_{21}E_aE_{LOy} & (T_{21}+\sigma T_{21})E_bE_{LOy} \end{pmatrix}$$

For purposes of brevity in formula writing, an equivalence is given below at (23).

$$\det(U)=U_{11}U_{22}-U_{21}U_{12} \quad (21)$$

Simplifying for (20) and using (21) obtains (22) below.

$$\frac{e^{i\theta_2-\theta_1}}{\det(U)}\begin{pmatrix} T_{11}(U_{22}+\sigma U_{21})+T_{21}(U_{12}+\sigma U_{11}) & \frac{E_b}{E_a}\begin{bmatrix}(U_{22}+\sigma U_{21})(T_{12}+\sigma T_{11})- \\ -(T_{22}+\sigma T_{21})(U_{12}+\sigma U_{11})\end{bmatrix} \\ \frac{E_a}{E_b}[T_{21}U_{11}-T_{11}U_{21}] & U_{11}(T_{22}+\sigma T_{21})-U_{21}(T_{12}+\sigma T_{11}) \end{pmatrix} \quad (22)$$

(22) can be further simplified to obtain (23) given below.

$$\frac{e^{i\theta_2-\theta_1}}{\det(U)}\begin{pmatrix} U_{22}T_{11}-U_{21}T_{21}+\sigma(U_{21}T_{11}-U_{11}T_{21}) & \frac{E_b}{E_a}\begin{bmatrix}U_{22}T_{12}-T_{22}U_{12}+ \\ \sigma(U_{21}T_{12}+T_{11}U_{22}-U_{12}T_{21}-U_{11}T_{22})+ \\ \sigma^2(U_{21}T_{11}-T_{21}U_{11})\end{bmatrix} \\ \frac{E_a}{E_b}[U_{11}T_{21}-U_{21}T_{11}] & U_{11}T_{22}-U_{21}T_{12}+\sigma(U_{11}T_{21}-U_{21}T_{11}) \end{pmatrix} \quad (23)$$

Continued simplification of (23) generates (24).

$$e^{i\theta_2-\theta_1}\begin{pmatrix} g+\sigma h^* & \frac{E_b}{E_a}[h+\sigma(g-g^*)+\sigma^2 h^*] \\ \frac{E_a}{E_b}(-h^*) & g^*-\sigma h^* \end{pmatrix} \quad (24)$$

This simplification can be made because $U^{-1}T$ is unitary and consequently, $U_{11}T_{22}-U_{21}T_{12}=(U_{22}T_{11}-U_{12}T_{21})^*$ and $U_{11}T_{21}-U_{21}T_{11}=-(U_{22}T_{12}-T_{22}U_{12})^*$. It should be noted that, for purposes of the present application, $E_aE_{LOx}$, $E_aE_{LOy}$, $E_bE_{LOx}$, and $E_bE_{LOy}$ are considered real numbers as they pertain to intensity. On the other hand, a, b, c, d, e, f, g, h, and a are complex numbers.

Next, calibration system 101 of the present embodiment removes the complex phase coefficient (25)

$$e^{i\theta_2-\theta_1} \quad (25)$$

from (24), as it carries no information of interest for the present calibration method. Calibration system 101 removes the phase coefficient (25) by adding the upper left and lower right matrix elements of (24). In so doing, calibration system 101 of the present embodiment obtains (26).

$$e^{i\theta_2 - \theta_1}[g + \sigma h^* + g^* - \sigma h^*] = 2e^{i\theta_2 - \theta_1}[Re\{g\}] \quad (26)$$

Furthermore, the phase of the result of (26) is given by (27), $$\theta_2 - \theta_1. \quad (27)$$

Consequently, in the present embodiment, calibration system 101 removes the phase coefficient of (24) by multiplying the matrix of (24) by (28) shown below.

$$\exp(-i(\theta_2 - \theta_1)) \quad (28)$$

As a result, calibration system 101 obtains from the data acquired at steps 502 and 504, a matrix (29) with elements.

$$M1 = \begin{pmatrix} g + \sigma h^* & \dfrac{E_b}{E_a}[h + \sigma(g - g^*) + \sigma^2 h^*] \\ \dfrac{-E_a}{E_b} h^* & g^* - \sigma h^* \end{pmatrix} \quad (29)$$

Although not shown in explicit detail for purposes of brevity, calibration system 101, of the present embodiment, performs a similar series of operations wherein (19) is multiplied by the inverse of (16) to generate another matrix (30) given below.

$$M2 = \begin{pmatrix} r + \sigma s^* & \dfrac{E_b}{E_a}[s + \sigma(r - r^*) + \sigma^2 s^*] \\ \dfrac{-E_a}{E_b} s^* & r^* - \sigma s^* \end{pmatrix} \quad (30)$$

Referring now to step 508 of FIG. 5, at this point in the present calibration method, calibration system 101 has obtained complex numbers representing respective elements in matrices (29) and (30). However, as recited in step 508, and as was described above in detail in conjunction with the two step approach, it is the goal of the present calibration method to determine the ratio, R, of $E_b$ and $E_a$ from the obtained complex numbers. Furthermore, due to the lack of polarization orthogonality, it is also a goal of the present calibration method to determine a from the obtained complex numbers. In so doing, and in a manner similar to that described in the above two step approach, the present calibration method is able to precisely measure the optical characteristics of a DUT. Details of the present calibration method are set forth below.

In one embodiment, the present calibration method solves for the ratio, R, and for a by first defining the value of $N_1$ as:

$$N_1 \equiv g + \sigma h^* - g + (\sigma h^*)^* = 2Re\{\sigma h^*\}. \quad (31)$$

In one embodiment, calibration system 101 finds the result shown as (31) by subtracting the conjugate of the lower-right element of the matrix (29) from the upper-left element of matrix (29). Similarly, calibration system 101 also defines $N_2$ as the result of subtracting the conjugate of the lower-right element of the matrix (30) from the upper-left element of matrix (30).

$$N_2 \equiv r + \sigma s^* - r + \sigma^* s = 2Re\{\sigma s^*\} \quad (32)$$

Proceeding still with step 508 of FIG. 5, in continuing to attempt to solve for the ratio, R, and for σ, the present method defines R as $$R \equiv \dfrac{E_b}{E_a} \quad (33)$$

for purposes of efficiency in computation. Furthermore, calibration system 101 of the present embodiment defines $N_3$ as the complex number corresponding to the lower-left element of the matrix (24). Thus, $$N_3 = \dfrac{-h^*}{R}. \quad (34)$$

Also, the present embodiment uses (34) to define an analytical expression for h* and s*, as shown at (35) and (36), respectively.

$$h^* = -RN_3 \quad (35)$$

$$s^* = -RN_4 \quad (36)$$

In (36), $N_4$ is the complex element at the lower left of matrix (30). Using (35) and (36), the present calibration method rewrites (31) and (32) as (37) and (38), respectively.

$$-2Re\{\sigma N_3\}R = N_1 \quad (37)$$

$$-2Re\{\sigma N_4\}R = N_2 \quad (38)$$

Because σ is complex, Equations (37) and (38) lead to the result that:

$$\dfrac{N_1}{N_2} = \dfrac{\sigma_R N_{3R} - \sigma_i N_{3i}}{\sigma_R N_{4R} - \sigma_i N_{4i}}. \quad (39)$$

where R and i subscripts indicate real and imaginary components, respectively. Solving further, the present calibration method obtains ρ, the ratio of the real and imaginary components of σ, where e $$\rho = \left( \dfrac{N_{3R} - N_{4R} \dfrac{N_1}{N_2}}{N_{3i} - N_{4i} \dfrac{N_1}{N_2}} \right) = \dfrac{\sigma_i}{\sigma_R}. \quad (40)$$

Using (37) and (38), x is defined according to (41) as $$x \equiv \sigma_R R = \dfrac{N_1}{-2[N_{3R} - \rho N_{3i}]}. \quad (41)$$

Multiplying the lower-left element of the matrix (29) by the upper-right element of matrix (29) obtains (42), $$N_6 = -|h|^2 - h^*(\sigma_R + i\rho\sigma_R)(g - g^*) - (\sigma_R + i\rho\sigma_R)g^{*2} \quad (42)$$

where $N_6$ is again a known quantity. Adding the upper-left element of matrix (29) to the lower-right element of matrix (29) obtains (43).

$$N_5 \equiv g - g^* + 2\sigma h^* \quad (43)$$

Equation (42) can be rewritten in terms of a and R to obtain (44) which is ultimately simplified as shown in (45), (46), and (47).

$$-|h|^2 - h^*(\sigma_R + i\sigma_R\rho)N_5 + (\sigma_S + i\rho\sigma_R)^2 h^{*2} = N_6 \quad (44)$$

$$-R^2|N_3|^2 + RN_3(\sigma_R + i\sigma_R\rho)N_5 + (\sigma_R + i\rho\sigma_R)^2 R^2 N_3^2 = N_6 \quad (45)$$

$$-R^2|N_3|^2 + N_3 N_5(x + i\rho x) + (x^2 - 2i\rho x^2 - \rho^2 x^2) N_3^2 = N_6 \quad (46)$$

$$R^2 = \frac{N_3 N_5 (x + i\rho x) + (x^2 + 2i\rho x - \rho^2 x^2) N_3^2 - N_6}{|N_3|^2} \quad (47)$$

The square root of the result given in (47) gives the ratio R. Next, using (41), (48) can be found.

$$\sigma_R = \frac{x}{R} \quad (48)$$

(47) and (48) are then used to solve for $\sigma_R$. Furthermore, using (49) below, $$\sigma_1 = \rho \sigma_R \quad (49)$$

The present calibration system 101 is able to solve for $\sigma$ itself. Thus, the present calibration method provides a method to solve for both the ratio, R, of $E_a$ and $E_b$, and the overlap parameter $\sigma$. R and $\sigma$ will be a function of the wavelength of the light used to obtain the first, second, and third set of interferometric measurements of the control optical element. The WRU 106 of FIG. 1 ensures that the wavelength of the light used to obtain the first, second, and third set of interferometric measurements of the control optical element will be a known value. Referring again to step 508 of FIG. 5, as will be shown below, by determining the ratio, R, and the overlap parameter $\sigma$, the present embodiment has achieved a precise calibration of the interferometric optical network analyzer. More specifically, by knowing the value of R, and the value of $\sigma$, a polarization-resolved transfer function matrix for a given DUT can now be determined. Stated differently, using the method and system of the present embodiment, a DUT can now be precisely measured without having any of the uncertainties associated with or intrinsic to the interferometric optical network analyzer affect the measurement of the DUT.

Figure 6:
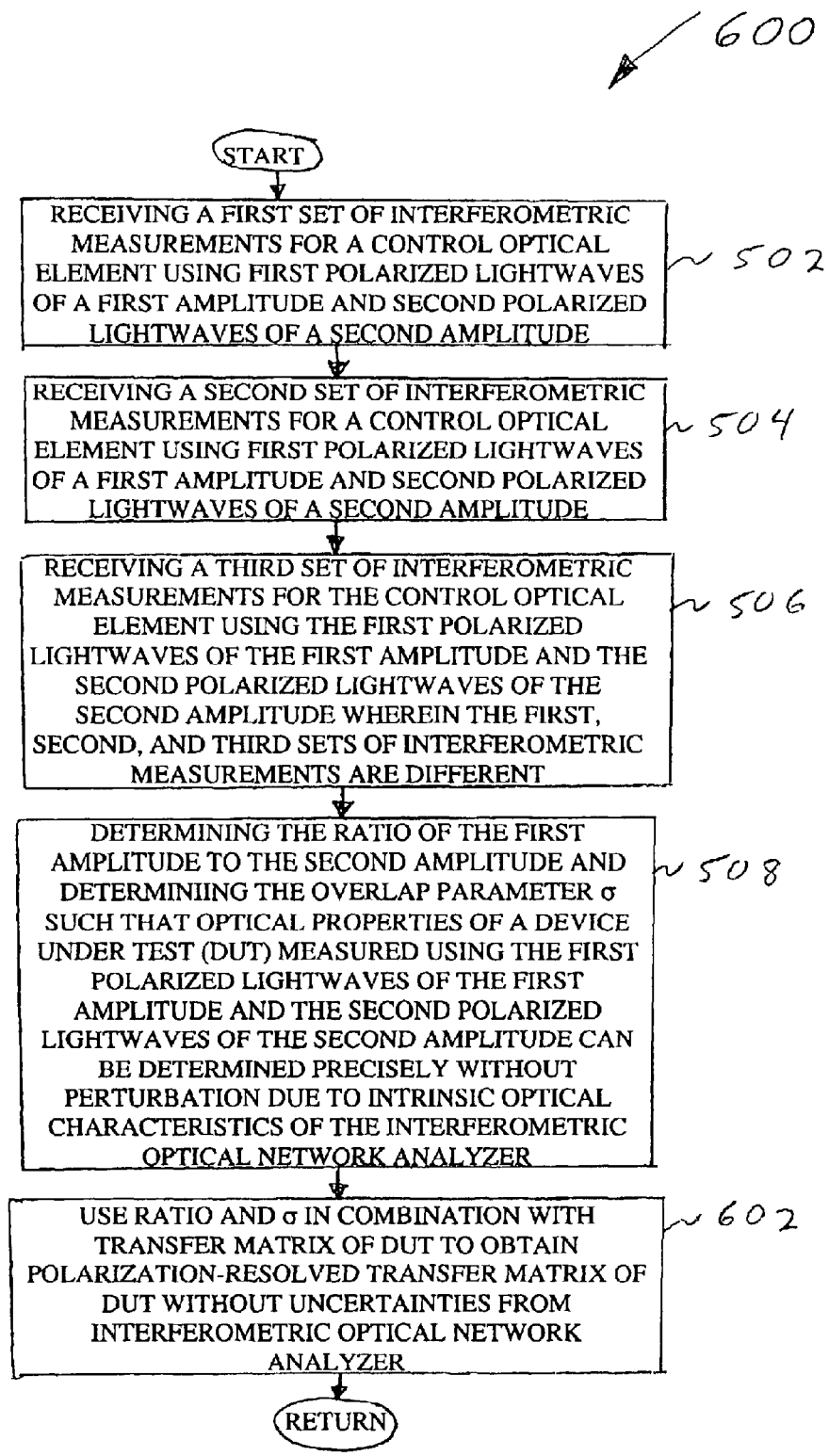
FIG. 6 is a flow chart of device-under-test (DUT) measurement steps performed in accordance with a three step approach embodiment of the present invention.

To further illustrate one embodiment of the present invention, after obtaining $\sigma$ and the ratio, R, of $E_b$ and $E_a$, a DUT replaces the control optical element (e.g. a patchcord) used to obtain the first, second, and third set of interferometric measurements. It is assumed, in this embodiment, that the electric-field amplitudes remain the same as they were when the first, second, and third set of interferometric measurements of the control optical element were taken. The DUT measurement step is shown as step 602 in flow chart 600 of FIG. 6. It will be seen that steps 502, 504, 506, and 508 of FIG. 6 are the same as those in FIG. 5, and a discussion of those steps is not repeated herein for purposes of brevity. Thus, as recited in step 602 of FIG. 6, the present embodiment receives interferometric measurements of a DUT on a calibrated interferometric optical network analyzer. For purposes of the present embodiment, a calibrated interferometric optical network analyzer is one for which steps 502–508 of FIG. 5 have been performed.

Referring still to step 602, from the received interferometric measurements of the DUT, calibration system 101 of the present embodiment obtains the matrix D shown below at (50) where J is the transfer function matrix of the device.

$$D = e^{i\theta_D} \begin{pmatrix} D_{11} E_a E_{LOx} & D_{12} E_b E_{LOx} \\ D_{21} E_a E_{LOy} & D_{22} E_b E_{LOy} \end{pmatrix} = PJ \quad (50)$$

The four elements of matrix D are complex numbers. At this time, however, the values for any of the individual field amplitudes ($E_a$, $E_b$, $E_{LOx}$, and $E_{LOy}$) or individual transfer function matrix elements ($D_{11}$, $D_{12}$, $D_{21}$, and $D_{22}$) are not known.

Using the earlier derived matrix (16) as the calibration matrix (referred to here as $M_{cal}$) the present embodiment then generates a new matrix shown by multiplying the inverse of $M_{cal}$ by D. The product is shown below at (51).

$$\frac{e^{i(\theta_D - \theta_i)}}{\det(U)} \begin{pmatrix} D_{11}(U_{22} + \sigma U_{21}) - D_{21}(U_{12} + \sigma U_{11}) & \frac{E_b}{E_a}\left[ \begin{array}{l}(U_{22} + \sigma U_{21})(D_{12} + \sigma D_{11}) - \\ (D_{22} + \sigma D_{21})(U_{12} + \sigma U_{11}) \end{array}\right] \\ \frac{E_a}{E_b}[D_{21}U_{11} - D_{11}U_{21}] & U_{11}(D_{22} + \sigma D_{21}) - U_{21}(D_{12} + \sigma D_{11}) \end{pmatrix} \quad (51)$$

Analogous to the above-described two step approach, the present embodiment seeks to obtain the matrix (52), (52) has no contribution from any uncertainties or errors in the interferometric optical network analyzer.

$$\frac{1}{\det(U)} \begin{pmatrix} D_{11}U_{22} - D_{21}U_{12} & U_{22}D_{12} - D_{22}U_{12} \\ D_{21}U_{11} - D_{11}U_{21} & U_{11}D_{22} - U_{21}D_{12} \end{pmatrix} = U^{-1}D = A^{-1}J \quad (52)$$

Using the present calibration method, matrix (52) can be obtained to within an unimportant complex constant from (51) and also using the values earlier obtained for $\sigma$ and the ratio, R, of $E_b$ and $E_a$. More specifically, the calibration system of the present embodiment multiplies the lower-left element of (51) by R to obtain (53).

$$D_{21}U_{11} - D_{11}U_{21} \quad (53)$$

The present embodiment then multiplies (53) by $\sigma$ and subtracts the product from the upper-left element and adds the product to the lower-right element. The resultant matrix is given below as (54).

$$\frac{e^{i(\theta_D - \theta_i)}}{\det(U)} \begin{pmatrix} D_{11}U_{22} - D_{21}U_{12} & \frac{E_b}{E_a}\left[ \begin{array}{l} U_{22}D_{12} + D_{22}U_{12} + \sigma\left( \begin{array}{l} U_{21}D_{12} - D_{11}U_{22} - \\ U_{12}D_{21} - U_{11}D_{22} \end{array} \right) \\ +\sigma^2(U_{21}D_{11} - D_{11}U_{11}) \end{array}\right] \\ D_{21}U_{11} - D_{11}U_{21} & U_{11}D_{21} - U_{21}D_{12} \end{pmatrix} \quad (54)$$

Continuing, the present calibration system 101 then compensates the upper-right element of (54) by multiplying by 1/R times the element. Subsequently, the product of a times the upper-left element should be subtracted from the upper-right element and $\sigma$ times the lower-right element should be added. Finally, the present calibration system 101 takes the product of $\sigma^2$ times the new lower-left element an adds it to the upper-left element. Ultimately, the present method obtains the result shown in (55).

$$\frac{e^{i(\theta_D - \theta_i)}}{\det(U)} \begin{pmatrix} D_{11}U_{22} - D_{21}U_{12} & U_{22}D_{12} - D_{22}U_{12} \\ D_{21}U_{11} - D_{11}U_{21} & U_{11}D_{21} - U_{21}D_{12} \end{pmatrix} \quad (55)$$

It will be seen that (55) is the same as (52) with the exception of a complex coefficient. This complex coefficient, however, has no effect on the measurement of the optical properties of the DUT. These optical properties include, for example, the transmissivity or reflectivity, insertion loss, polarization dependent loss (PDL), group delay, polarization mode dispersion (PMD), and chromatic dispersion of the DUT. Thus, the present embodiment enables determination of a polarization-resolved transfer function of a DUT.

Figure 7:
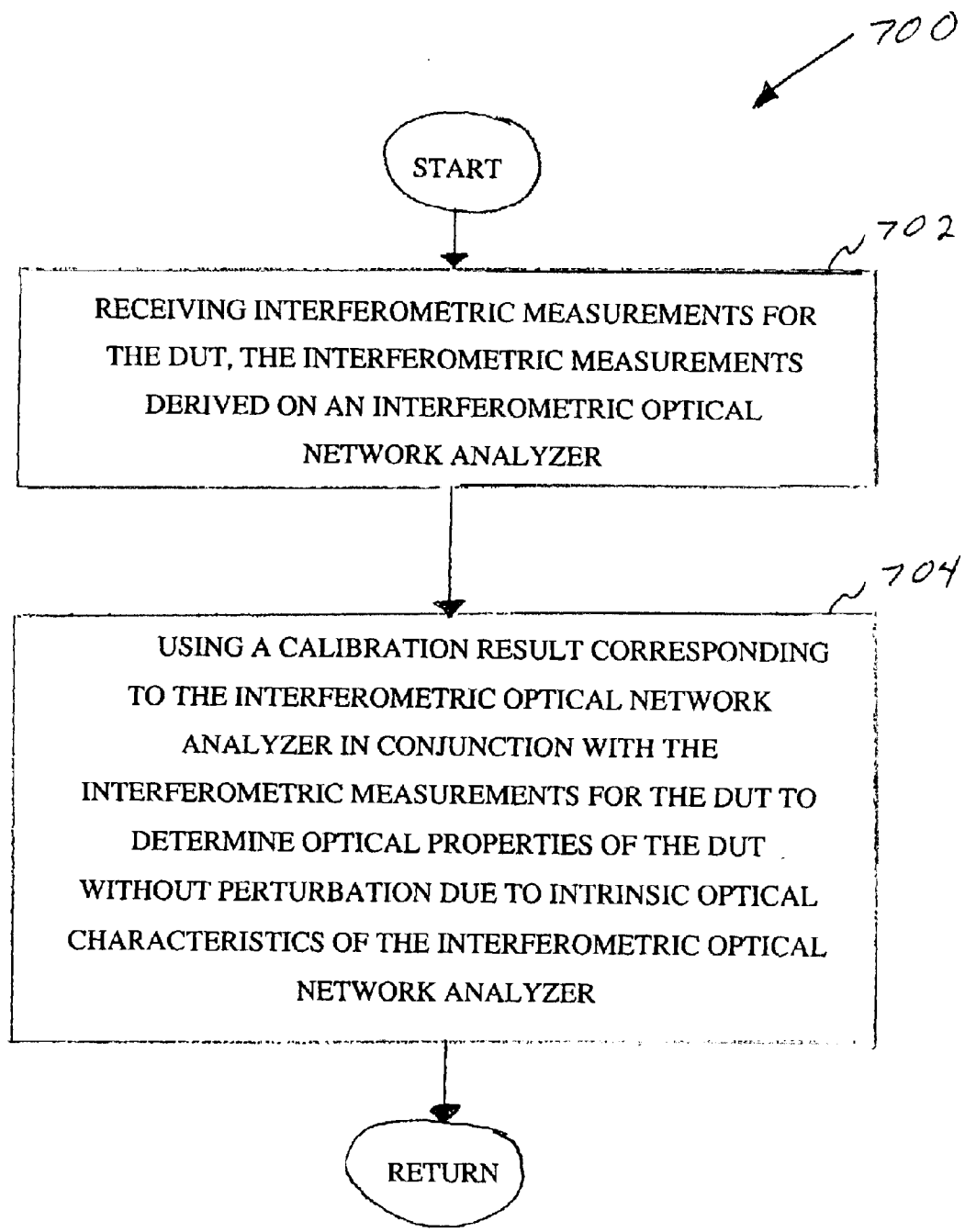
FIG. 7 is a flow chart of device-under-test (DUT) measurement steps performed after calibration of an interferometric optical network analyzer in accordance with one embodiment of the present invention.

With reference now to FIG. 7, a flow chart 700 of steps performed in accordance with one embodiment of the present invention is shown. Specifically, flow chart 700 of FIG. 7 provides a summary of steps that are performed, in one embodiment, after the calibration steps of FIG. 3 or 5 have been completed. At step 702, interferometric measurements for a DUT are obtained in a manner as described above.

Referring now to step 704, the present embodiment then uses a calibration result corresponding to the interferometric optical network analyzer in conjunction with the interferometric measurements for the DUT to determine optical properties of the DUT with reduced uncertainty due to intrinsic optical characteristics of the interferometric optical network analyzer. In one embodiment (e.g. the embodiment described in conjunction with FIG. 3), the calibration result is the ratio, R, of $E_y$ and $E_x$, and the matrix W shown at (2). In another embodiment (e.g. the embodiment described in conjunction with FIG. 5), the calibration result is comprised of σ, $M_{cal}$, and the ratio, R, of $E_b$ and $E_a$.

In the present embodiment, the calibration result derived by the present calibration system is comprised of σ, $M_{cal}$, and the ratio, R, of $E_b$ and $E_a$. That is, for purposes of clarity, the above description of the present calibration method derives a particular calibration result (i.e. σ, $M_{cal}$, and the ratio, R, of $E_b$ and $E_a$), but the present invention is not limited to the derivation of such a particular calibration result. Hence, it should be understood, that the present invention is also well suited to deriving various other calibration results and using those calibration results to determine the optical properties of the DUT. That is, present invention is well suited to obtaining and using various other types of calibration results which are derived, for example, using a plurality of interferometric measurements of a control optical element. As a further example, the plurality of interferometric measurements can be analyzed using numerous approaches to ultimately derive the effect of the intrinsic optical characteristics and corresponding error of the interferometric optical network analyzer. Embodiments of the present invention are then well suited to using the intrinsic optical characteristic information to remove corresponding uncertainties from measurements of a DUT (e.g. to calibrate the interferometric optical network analyzer). Therefore, the optical properties of the DUT can be determined reduced error or uncertainty attributable to the intrinsic optical characteristics or uncertainty of the interferometric optical network analyzer.

Also, because the present embodiment is able to calibrate the interferometric optical network analyzer using the method described in conjunction with steps 502–508 of FIG. 5, the present embodiment eliminates the need for very expensive and optically inert components within the interferometric optical network analyzer. Instead, the present embodiment allows the interferometric optical network analyzer to be comprised of less expensive components and then compensates for any uncertainties caused thereby using the calibration method of FIG. 5.

As yet an additional benefit, the present embodiment is able to precisely obtain the optical properties of the DUT with only three interferometric calibration measurements. Also, the calibration method of the present embodiment, as performed by calibration system 101 of FIG. 1, does not require excessive special training of or place severe technical demands on an end user. Thus, the present embodiment provides a method and system to readily determine the optical characteristics of an optical component. Various embodiments of the present invention further provide a method and system which achieve the above accomplishment and can precisely determine the optical characteristics of an optical component. Various embodiments of the present invention also provide a method and system which achieve the above accomplishments and which do not require the use of an optical network analyzer comprised of optically inert components.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. An apparatus for calibrating an interferometric optical network analyzer, said apparatus comprising:
   an interferometric measurement receiving portion for receiving a plurality of sets of interferometric measurements for a control optical element, said plurality of sets of interferometric measurements obtained using first polarized lightwaves of a first amplitude and second polarized lightwaves of a second amplitude;
   a processor for deriving a calibration result for said interferometric optical network analyzer, said calibration result obtained using said plurality of sets of interferometric measurements, said processor coupled to said interferometric measurement receiving portion, said calibration result enabling the optical properties of a device under test (DUT) to be measured with reduced uncertainty due to intrinsic optical characteristics of said interferometric optical network analyzer; and
   a user interface coupled to said processor.

2. The apparatus of claim 1 wherein at least a portion thereof is integral with an interferometric optical network analyzer.

3. The apparatus of claim 1 wherein said calibration result is comprised of a ratio of said first amplitude to said second amplitude, and a calibration matrix corresponding to said interferometric optical network analyzer.

4. The apparatus of claim 1 wherein said calibration result is comprised of a ratio of said first amplitude to said second amplitude, an overlap parameter, and a calibration matrix corresponding to said interferometric optical network analyzer.

5. An interferometric optical network analyzer system comprising:
   an interferometric optical network analyzer;
   an interferometric measurement receiving portion for receiving a plurality of sets of interferometric measurements for a control optical element, said plurality of interferometric measurements obtained using first polarized lightwaves of a first amplitude and second polarized lightwaves of a second amplitude;

a processor for deriving a calibration result for said interferometric optical network analyzer, said calibration result obtained using said plurality of sets of interferometric measurements, said processor coupled to said interferometric measurement receiving portion, said calibration result enabling the optical properties of a device under test (DUT) to be measured with reduced uncertainty due to intrinsic optical characteristics of said interferometric optical network analyzer; and a user interface coupled to said processor.

6. The interferometric optical network analyzer system of claim 5 wherein at least one of said interferometric measurement receiving portion, said memory, said processor, and said user interface is integral with said interferometric optical network analyzer.

7. The interferometric optical network analyzer system of claim 5 wherein said calibration result is comprised of a ratio of said first amplitude to said second amplitude, and a calibration matrix corresponding to said interferometric optical network analyzer.

8. The interferometric optical network analyzer system of claim 5 wherein said calibration result is comprised of a ratio of said first amplitude to said second amplitude, an overlap parameter, and a calibration matrix corresponding to said interferometric optical network analyzer.

9. A method for calibrating an interferometric optical network analyzer, said method comprising:

receiving a first set of interferometric measurements for a control optical element, said first set of interferometric measurements obtained using first polarized lightwaves of a first amplitude and second polarized lightwaves of a second amplitude;

receiving a second set of interferometric measurements for said control optical element, said second set of interferometric measurements obtained using said first polarized lightwaves of said first amplitude and said second polarized lightwaves of said second amplitude wherein said first and second sets of interferometric measurements are different;

determining the ratio of said first amplitude to said second amplitude such that optical properties of a device under test (DUT) measured using said first polarized lightwaves of said first amplitude and said second polarized lightwaves of said second amplitude can be determined with reduced uncertainty due to intrinsic optical characteristics of said interferometric optical network analyzer.

10. The method for calibrating an interferometric optical network analyzer as recited in claim 9 wherein said control optical element is comprised of a patchcord.

11. The method for calibrating an interferometric optical network analyzer as recited in claim 10 wherein said first set of interferometric measurements are obtained from said patchcord disposed in a first orientation, and said second set of interferometric measurements are obtained from said patchcord disposed in a second orientation.

12. The method for calibrating an interferometric optical network analyzer as recited in claim 9 wherein said first polarized lightwaves of said first amplitude and said second polarized lightwaves of said second amplitude are orthogonally polarized.

13. A computer readable medium having computer readable instructions stored thereon for causing a processor to perform interferometric optical network analyzer calibration steps comprising:

processing first interferometric measurements for a control optical element;

processing second interferometric measurements for said control optical element wherein said first and second interferometric measurements are different;

deriving the ratio of a first amplitude of first polarized lightwaves to a second amplitude of second polarized lightwaves wherein said first and second polarized lightwaves were used to obtain said first and second interferometric measurements, said ratio enabling the optical properties of a device under test (DUT) to be measured with reduced uncertainty due to intrinsic optical characteristics of said interferometric optical network analyzer.

14. The computer readable medium as recited in claim 13 further having computer readable instructions stored thereon for causing said processor to process said first and second interferometric measurements when said control optical element is comprised of a patchcord.

15. The computer readable medium as recited in claim 14 further having computer readable instructions stored thereon for causing said processor to process said first and second interferometric measurements when said first interferometric measurements are obtained from said patchcord disposed in a first orientation, and said second interferometric measurements are obtained from said patchcord disposed in a second orientation.

16. The computer readable medium as recited in claim 13 further having computer readable instructions stored thereon for causing said processor to process said first and second interferometric measurements when said first polarized lightwaves of said first amplitude and said second polarized lightwaves of said second amplitude are orthogonally polarized.

17. A method for calibrating an interferometric optical network analyzer, said method comprising:

receiving three sets of interferometric measurements for a control optical element, said three sets of interferometric measurements obtained using first polarized lightwaves of a first amplitude and second polarized lightwaves of a second amplitude, wherein each of said three sets of interferometric measurements are different;

determining the ratio of said first amplitude to said second amplitude and determining an overlap parameter of said first polarized lightwaves and said second polarized lightwaves such that optical properties of a device under test (DUT) measured using said first polarized lightwaves of said first amplitude and said second polarized lightwaves of said second amplitude can be determined with reduced uncertainty due to intrinsic optical characteristics of said interferometric optical network analyzer.

18. The method for calibrating an interferometric optical network analyzer as recited in claim 17 wherein said control optical element is comprised of a patchcord.

19. The method for calibrating an interferometric optical network analyzer as recited in claim 18 wherein said three sets of interferometric measurements are obtained from said patchcord disposed in a three different orientations.

20. The method for calibrating an interferometric optical network analyzer as recited in claim 17 wherein said first polarized lightwaves of said first amplitude and said second polarized lightwaves of said second amplitude are not orthogonally polarized.

21. A computer readable medium having computer readable instructions stored thereon for causing a processor to perform interferometric optical network analyzer calibration steps comprising:

processing a plurality of interferometric measurements for a control optical element wherein each of said plurality interferometric measurements are different, said plurality of interferometric measurements obtained using first polarized lightwaves of a first amplitude and second polarized lightwaves of a second amplitude; and deriving a calibration result for said interferometric optical network analyzer, said calibration result obtained using said plurality of sets of interferometric measurements, said calibration result enabling the optical properties of a device under test (DUT) to be measured using said first polarized lightwaves of said first amplitude and said second polarized lightwaves of said second amplitude with reduced uncertainty due to intrinsic optical characteristics of said interferometric optical network analyzer.

22. The computer readable medium as recited in claim 21 further having computer readable instructions stored thereon for causing said processor to derive said calibration result by:

deriving the ratio of said first amplitude of said first polarized lightwaves to said second amplitude of second polarized lightwaves wherein said first and second polarized lightwaves were used to obtain said plurality of interferometric measurements; and determining the overlap parameter of said first polarized lightwaves and said second polarized lightwaves said ratio and said overlap parameter enabling the optical properties of a device under test (DUT) to be measured with reduced uncertainty due to intrinsic optical characteristics of said interferometric optical network analyzer.

23. The computer readable medium as recited in claim 21 further having computer readable instructions stored thereon for causing said processor to process said plurality of interferometric measurements when said control optical element is comprised of a patchcord.

24. The computer readable medium as recited in claim 23 further having computer readable instructions stored thereon for causing said processor to process said plurality of interferometric measurements wherein a first interferometric measurement is obtained from said patchcord disposed in a first orientation, a second interferometric measurement is obtained from said patchcord disposed in a second orientation and a third interferometric measurement is obtained from said patchcord disposed in a third orientation.

25. The computer readable medium as recited in claim 21 further having computer readable instructions stored thereon for causing said processor to process said first, second, and third interferometric measurements when said first polarized lightwaves of said first amplitude and said second polarized lightwaves of said second amplitude are not orthogonally polarized.

26. An interferometric method for calibrating an interferometric optical network analyzer, said method comprising:

receiving a plurality of sets of interferometric measurements for a control optical element, said plurality of interferometric measurements obtained using first polarized lightwaves of a first amplitude and second polarized lightwaves of a second amplitude;

deriving a calibration result for said interferometric optical network analyzer, said calibration result derived using said plurality of sets of interferometric measurements, said calibration result enabling the optical properties of a device under test (DUT) to be measured with reduced uncertainty due to intrinsic optical characteristics of said interferometric optical network analyzer.

27. The method of claim 26 wherein said calibration result is comprised of a ratio of said first amplitude to said second amplitude, and a calibration matrix corresponding to said interferometric optical network analyzer.

28. The method of claim 26 wherein said calibration result is comprised of a ratio of said first amplitude to said second amplitude, an overlap parameter, and a calibration matrix corresponding to said interferometric optical network analyzer.

* * * * *